United States Patent [19]

Oike

[11] Patent Number: 4,873,533
[45] Date of Patent: Oct. 10, 1989

[54] MARKER FOR LOCATING A BURIED OBJECT

[75] Inventor: Tomoyasu Oike, Sagamihara, Japan

[73] Assignee: Minnesota Mining and Manufacturing Company, St. Paul, Minn.

[21] Appl. No.: 106,343

[22] Filed: Oct. 9, 1987

[30] Foreign Application Priority Data

Nov. 18, 1986 [JP] Japan ............................ 61-176955[U]

[51] Int. Cl.$^4$ ........................... H01Q 1/04; H01Q 1/40
[52] U.S. Cl. .................................... 343/744; 343/719; 324/329; 340/572
[58] Field of Search ................. 343/719, 744; 340/571, 340/572; 324/329

[56] References Cited

U.S. PATENT DOCUMENTS

| 3,216,016 | 11/1965 | Tanner | 343/741 |
| 3,836,842 | 9/1974 | Zimmermann et al. | 324/329 |
| 4,334,227 | 6/1982 | Marks | 343/719 |
| 4,618,861 | 10/1986 | Gettens et al. | 340/573 |
| 4,712,094 | 12/1987 | Bolson, Sr. | 324/329 |
| 4,755,806 | 7/1988 | Villarreal | 340/572 |

Primary Examiner—Rolf Hille
Assistant Examiner—D. Johnson
Attorney, Agent, or Firm—Donald M. Sell; Robert L. Marben

[57] ABSTRACT

A marker for positioning near a buried object wherein the marker can be detected to locate the buried object. The marker includes a passive resonant type antenna which becomes inoperative when the initial position for the buried marker is changed. A lead wire and/or a mercury switch that is a part of the antenna serve to make the antenna inoperative due to such change in the initial position of the marker.

5 Claims, 5 Drawing Sheets

MARKER FOR LOCATING A BURIED OBJECT

BACKGROUND OF THE INVENTION

This invention relates to a marker for locating a buried object, such as a gas pipe or water pipe, wherein the marker is buried near the buried object with the marker being capable of being detected thereby serving to locate the buried object.

An example of a conventional detection system using a marker for locating a buried object is shown in FIG. 1. According to this drawing, a detectable marker 2 is installed in proximity to a buried object 1. In this case, the buried object 1 is a metal tubular member, and the marker 2 is placed under the ground about 10 cm distant upward of the buried object 1. The marker 2, as shown in greater detail in FIGS. 2–4, comprises an antenna 6 of the passive resonance type which includes a coil 5 and a capacitor 4 sealed in a marker case 3 which is usually made of polyethylene or the like. In the conventional detection systems, when an electromagnetic wave of the resonant frequency of the marker is transmitted from above the ground toward the buried marker 2 by use of an apparatus comprising a locator 7 and a probe 8, the marker 2 responds and resonates with the electromagnetic wave which is detected by the locator 7 and probe 8. The best response is obtained when the marker 2 is in the horizontal position. Detection of the marker 2 in this manner serves to locate the buried object 1 with which it is associated. An example of such a detection system is found in an electronic marker system (EMS) available from Minnesota Mining and Manufacturing Company, St. Paul, Minn., U.S.A.

In such prior art detection systems, where the marker 2 is installed in proximity to the buried object 1, work requiring the excavation of the buried object 1, other excavation work or such natural phenomenon as an earthquake or sedimentation may change the position of the marker 2 from its original position of installation wherein the marker 2 is then inclined from the horizontal and about the axis 9 of the buried object 1 or displaced relative to the buried object 1. If an attempt is made to locate the buried object 1 by detecting the marker when it is thus inclined or displaced, an excavation might be made on the basis of detection made of the marker, with the result that the buried object is not reached directly causing a waste of labor and possible damage to the buried object. In situations where a wide variety of buried objects are installed in close distance from each other, there is a greater likelihood of inconveniences being caused by an excavation made on the basis of the detection made of an inclined or displaced marker.

SUMMARY OF THE INVENTION

The object of the present invention is to provide a marker for positioning in proximity to a buried object the marker being detectable to locate the buried object wherein the marker is responsive to an electromagnetic wave enabling the marker to be located and cannot so respond if the marker buried underground is inclined or displaced.

The marker for locating a buried object according to the present invention is installed in proximity to an underground buried object, and can be detected by use of the fact that an antenna of the passive resonance type is resonantly responsive to an electromagnetic wave of a specific frequency sent from above the ground surface wherein the marker has an antenna of the passive resonance type and includes means for automatically preventing any resonant response to an electromagnetic wave due to changes, such as inclination or displacement, of the marker that may occur subsequent to the initial positioning of the marker.

As will be obvious from the detailed explanation that will be given of the present invention, the antenna of the passive resonance type housed in the marker is provided with a mercury switch or the like or a part of a coil is extended which can be fixedly secured to a buried object, so that in the case the marker is inclined or displaced, after it has been positioned, the antenna of the passive resonance type is made inoperative, whereby a resonant response of the marker to the electromagnetic wave cannot be produced, thus preventing wasteful labor of excavation by error or the damage of other buried objects due to excavation at a point indicated by the detection of an inclined or displaced marker if the marker were operative. If other buried objects in the area of excavation include a water or gas pipe and are latently damaged, a secondary accident may occur, such as toxication by gas, gas explosion, inundation of a house by water gushed out or traffic congestion. According to this invention, such accidents can be prevented effectively.

BRIEF DESCRIPTION OF THE DRAWINGS

The novel features and advantages of the invention presented herein will become more apparent to those skilled in the art upon consideration of the following detailed description which refers to the drawings, wherein like reference numerals refer to like or similar parts, and wherein.

DETAILED DESCRIPTION

Figure 1:
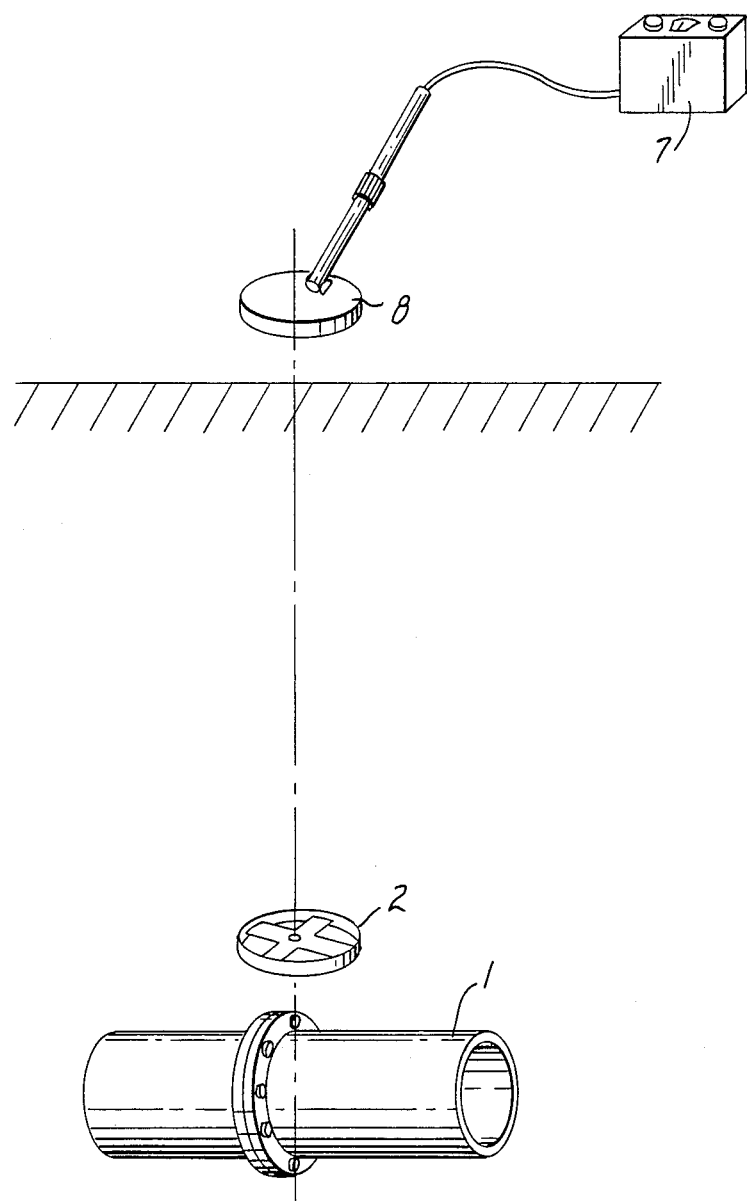
FIG. 1 shows the use of a prior art marker and is used in a system wherein the marker is positioned in proximity to a buried object for detection by an instrument operated above ground.
Figure 2:
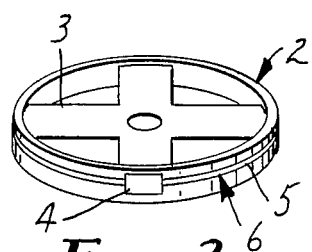
FIGS. 2–4 are diagrams showing the configuration of a prior art marker.
Figure 3:
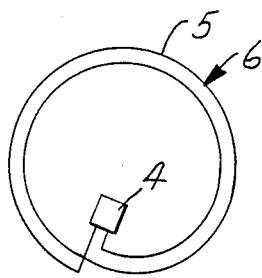
Figure 4:
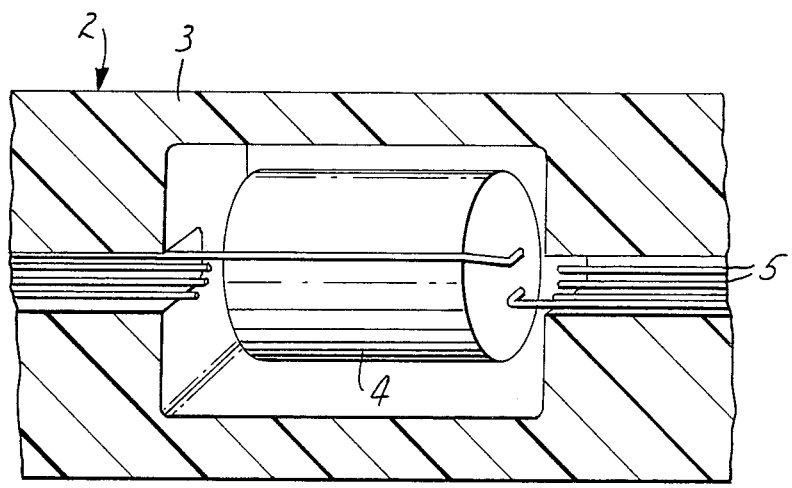

The basic configuration of the marker for detecting a buried object according to the present invention is identical to that of the prior art marker that has been described with references to FIGS. 1–4. Those component elements described below which are identical to those component elements shown in FIGS. 1–4 are designated by the same reference numerals used in FIGS. 1–4.

Figure 5:
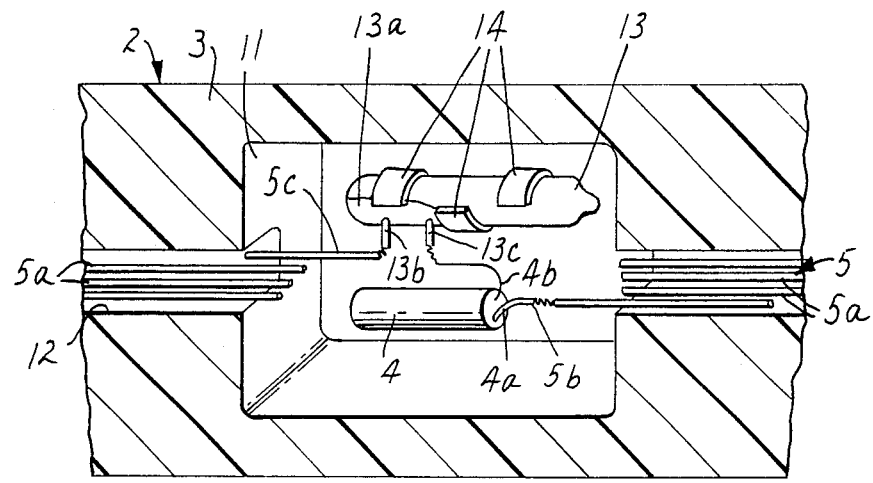
FIG. 5 is a partial showing of a marker embodying the invention.

Referring to FIG. 5 of the drawings, one embodiment of the invention is shown. A part of an antenna of the passive resonance type with the essential parts of a marker case is shown in enlarged view. The case 3 of the marker 2 is made of a general purpose plastic with a small space formed in part of the interior of the marker case 3, and a hole 12 provided along the entire peripheral annular part of the marker case 3. The small space 11 communicates with the hole 12. The hole 12 has arranged therein a coil 5 including a multiplicity of windings 5a. A capacitor 4 and a mercury switch 13 are housed in the small space 11, and are arranged in a predetermined position. The mercury switch 13 is held by three holders 14. The capacitor 4 and the mercury switch 13 each have two external terminals. A terminal 5b of the coil 5 is connected to a terminal 4a of the capacitor 4 with the other terminal 5c of the coil 5 connected to a terminal 13b of the mercury switch 13. The other terminal 4b of the capacitor 4 is connected to the other terminal 13c of the mercury switch 13. Specifically, FIG. 5 shows an antenna of the passive resonance type formed with the coil 5, capacitor 4 and the mercury switch 13 connected in series.

The mercury switch 13 is so constructed as to contain a predetermined amount of fluid mercury 13a in a case. When the mercury switch 13 is in normal position, the mercury 13a provides a conductive path between the two terminals 13b and 13c. When the mercury switch 13 is not in normal position, the mercury 13a moves to remove the conductive path it otherwise provides between the terminals 13b and 13c to cause the switch 13 to present an electrical open.

The mercury switch 13 is mounted on the marker case 3 in such a way that when the marker 2 is held in horizontal position, the switch 13 is in the state of the normal position wherein a conductive path is provided by the mercury 13a between the terminals 13b and 13c.

So long as the marker 2, having such a construction as described above, is positioned with the switch 13 in the normal position to place the flat surface portion of the marker 2 in a horizontal position in proximity to a buried object, the mercury switch 13 is electrically closed causing marker 2 to be resonantly responsive to a detection electromagnetic wave to enable it to be detected. In the event that the marker 1 is inclined into abnormal position by reason of some circumstances causing the mercury switch 13 to be electrically open, the coil 5 is disconnected from the capacitor 4, so the marker 2 cannot resonantly respond to a detection electromagnetic wave sent from above the ground surface. Specifically, in the case where the marker 2 is displaced to an inclined position, the mercury switch 13 presents an electrical open, with the result that antenna of the passive resonance type ceases to function. The marker cannot be detected from the ground surface when the mercury switch 13 presents an electrical open. As a result, unlike the marker of the prior art, the marker 2 when so inclined will not be detected thereby avoiding the situation where a detection of the marker would erroneously indicate the position of the buried object associated with the marker.

Figure 6:
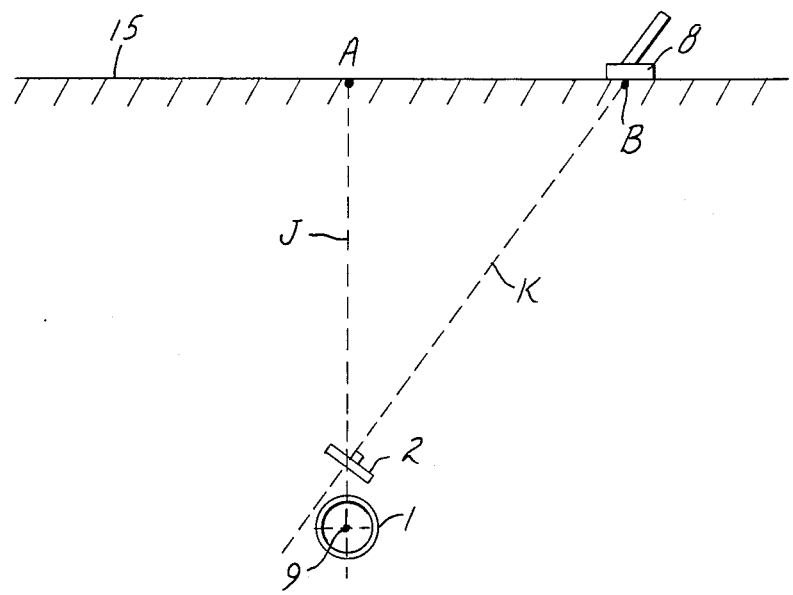
FIG. 6 illustrates detection of a marker when it is in an inclined position.

Referring to FIG. 6, an operative marker 2 is readily responsive to electromagnetic waves J and K that are perpendicular to the plane thereof. From this showing it is apparent that the accuracy of the marker 2 for establishing the position of a buried object is particularly affected when the marker is moved to an inclined position by movement about the axis 9 of a buried object 1 that is made of a long tubular material such as a water pipe. In this case, the responding point B obtained by the probe 8 present on the ground 15 is greatly displaced from the point A which would otherwise be obtained as a point of burial of the buried object 1 if the marker 2 were not inclined. By contrast, if the marker 2 were inclined along the direction of the axis 9 of the buried object 1, the position of detection by the probe 8 would lie along the buried object if it were linear in nature, such as a pipe. In actual practice, therefore, it is desirable to set the mercury switch 13 on the marker 2 in such a manner that the mercury switch 13 presents an open when an inclination of the marker 2 occurs due to movement of the marker 2 around the axis 9 of the buried object 1.

It will be appreciated by those of ordinary skill in the art that instead of using a mercury switch as a means for disabling the marker 2 due to the inclination of the marker as described for the aforementioned embodiment, another switch means having a similar function may also be employed.

Figure 7:
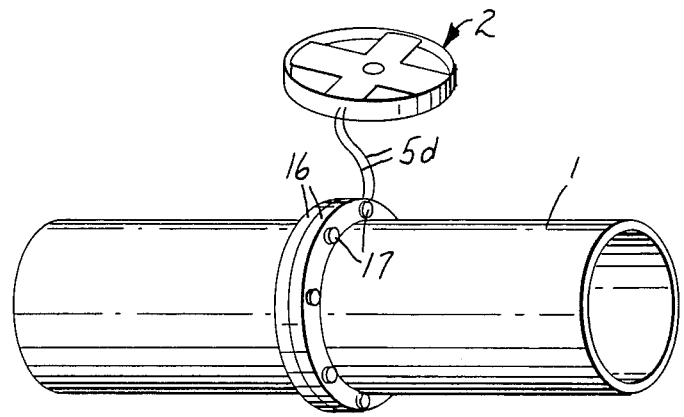
FIGS. 7 and 8 illustrate another embodiment of the invention.

FIG. 7 shows a second embodiment of the invention. In this embodiment, a lead wire 5d making up an extension of a part of the coil 5 configuring the antenna of the passive resonance type is led out of the marker 2, and a portion of the lead wire 5d is fixedly attached to the buried object 1 in any suitable manner. In the case shown in FIG. 7, this fixing is effected by using a bolt 17 of a flange 16 making up a coupling of the buried object 1. According to this configuration, displacement of the marker 2 relative to the buried object 1 will cause the lead wire 5d to be severed so the antenna of the passive resonance type in the marker cannot respond to an electromagnetic wave sent from the ground surface, thus preventing the marker 2 from being detected. If the lead wire 5d is to be severed during an ordinary excavation work or the like, it is desirable to use a lead wire which is severed by a tensile strength of about 10 kg.

Figure 8:
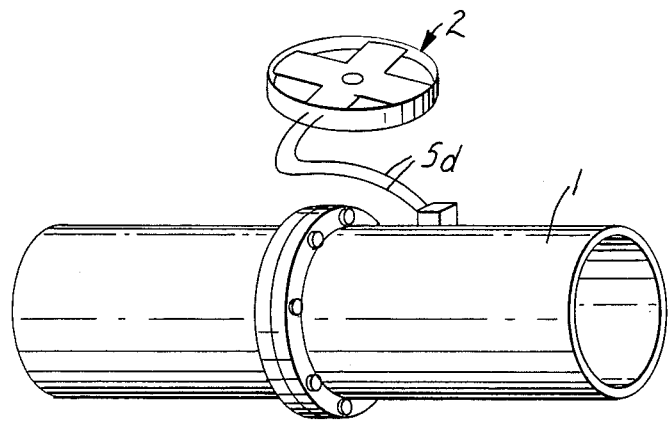

The embodiment shown in FIG. 8, like that shown in FIG. 7, is so configured that a lead wire 5d is led out of the marker. In this embodiment, however, an end of the lead wire 5d is fixedly secured to the buried object 1 by use of adhesive.

Figure 9:
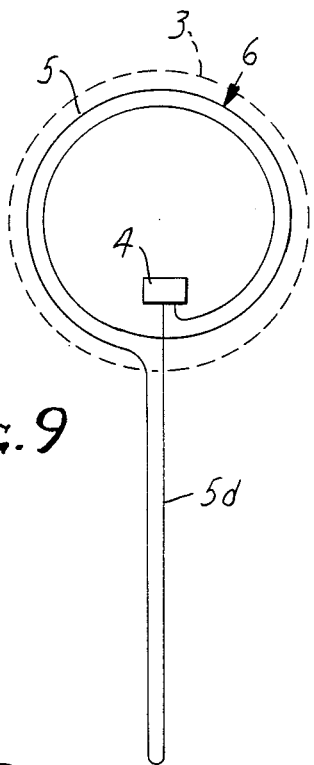
FIG. 9 is a showing of the antenna configuration used in the embodiment of FIGS. 7 and 8.

FIG. 9 shows the electrical component configuration of the antenna of the passive resonance type contained in the marker used for the embodiments shown in FIGS. 7 and 8. It includes a capacitor 4, a wire coil 5 having a multiplicity of turns, and a lead wire portion 5d extending from the coil 5. The wire portion 5d is a part of the windings of the coil 5.

Figure 10:
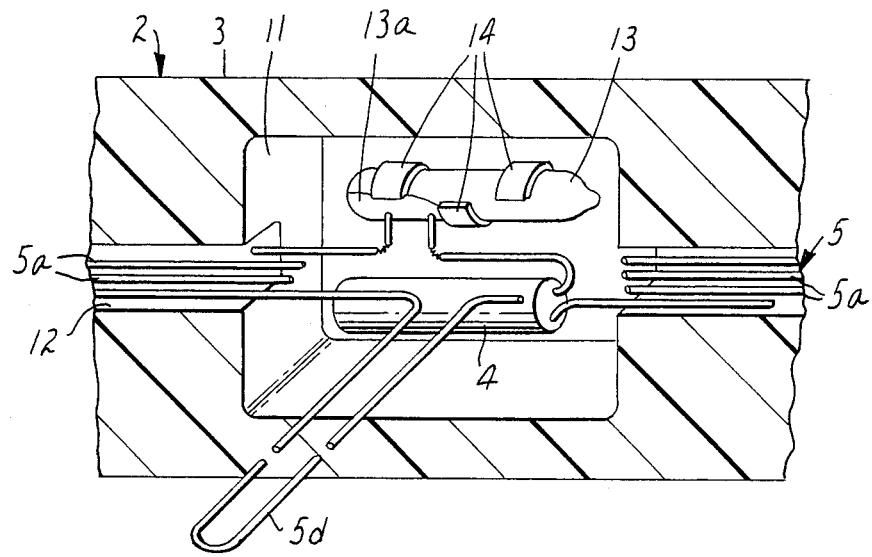
FIG. 10 illustrates a third embodiment of the invention.

FIG. 10 shows still another embodiment comprising a combination of the first embodiment shown in FIG. 5 and the second embodiment showing in FIGS. 7–9. Specifically, a marker is provided which comprises a mercury switch 13 adapted to be on or off according to the position of the marker 2 and a lead wire 5d made of an outward extension of a part of the coil 5. According to this configuration, the marker 2 can become inoperative due to the marker becoming inclined relative to the horizontal or being displaced relative to the buried object with which it is used.

Each of the above-mentioned embodiments is usable with the electronic marker system (EMS) available from the Minnesota Mining and Manufacturing Company, St. Paul, Minn., U.S.A.

The marker case 3 used in each of the above-mentioned embodiments may be made using general-purpose plastic such as polyethylene. The coil 5 for the antenna 6 of the passive resonant type requires about 10 to 15 meters of wire to provide 15 to 23 turns. The wire core is about 0.5 mm in diameter and is 5 to 15 kg in tensile strength. The capacitor 4 is 0.008 to 0.015 $\mu$F. As a result, the resonant frequency for a marker is 80 to 160 KHz, and the detection distance thereof is normally several tens to 140 cm. The mercury switch 13, as shown in the first embodiment, can be a Model B mercury switch available from Nemoto Limited in Japan. The lead wire 5d portion used in the second embodiment is about 3 to 6 cm long.

A ferrite marker is also available. This marker, which includes a winding or coil wound on a ferrite core, operates on the same basic principle. The mercury switch and an antenna of passive resonance type aspects used in the above-mentioned embodiments may be applied also to this marker.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

I claim:

1. A marker for positioning in proximity to a buried object, the marker being detected to locate the buried object by use of the fact that an antenna of the passive resonance type having a coil and capacitor connected in a closed series circuit for operation, which forms a part of the marker, is resonantly responsive to an electromagnetic wave of a specified frequency transmitted to the marker, the marker including means forming a part of the series circuit for opening the series circuit in response to a change, such as inclination and displacement, of the marker from its initial position of installation thereby preventing the occurrence of any resonant response by the marker to an electromagnetic wave transmitted subsequent to the occurrence of such change, said means including a switch which is position sensitive for presenting an electrical open or closure, said switch presenting an electrical open in response to the inclination of the marker from its initial position of installation.

2. A marker according to claim 1 wherein said switch is a mercury switch.

3. A marker for positioning in proximity to a buried object, the marker being detected to locate the buried object by use of the fact that an antenna of the passive resonance type having a coil and capacitor connected in a closed series circuit for operation, which forms a part of the marker, is resonantly responsive to an electromagnetic wave of a specified frequency transmitted to the marker, the marker including means forming a part of the series circuit for opening the series circuit in response to a change, such as inclination and displacement, of the marker from its initial position of installation thereby preventing the occurrence of any resonant response by the marker to an electromagnetic wave transmitted subsequent to the occurrence of such change, said means including a lead wire, formed from a part of the coil, which can be fixedly secured to the buried object whereby said lead wire can be broken to open the series circuit in response to displacement of the marker from its initial position of installation.

4. A marker for positioning in proximity to a buried object, the marker being detected to locate the buried object by use of the fact that an antenna of the passive resonance type having a coil and capacitor connected in a closed series circuit for operation, which forms a part of the marker, is resonantly responsive to an electromagnetic wave of a specified frequency transmitted to the marker, the marker including means forming a part of the series circuit for opening the series circuit in response to a change, such as inclination and displacement, of the marker from its initial position of installation thereby preventing the occurrence of any resonant response by the marker to an electromagnetic wave transmitted subsequent to the occurrence of such change, said means including a switch which is position sensitive for presenting an electrical open or closure, said switch presenting an electrical open in response to the inclination of the marker from its initial position of installation, and a lead wire, formed from a part of the coil, which can be fixedly secured to the buried object whereby said lead wire can be broken to open the series circuit in response to displacement of the marker from its initial position of installation.

5. A marker according to claim 4 wherein said switch is a mercury switch.

* * * * *